United States Patent [19]

Hicks et al.

[11] 4,331,300
[45] May 25, 1982

[54] ROTARY CUTTER BLADE

[75] Inventors: William R. Hicks, Spencerport; Bhim S. Madan, Brockport, both of N.Y.

[73] Assignee: General Electric Company, New York, N.Y.

[21] Appl. No.: 146,312

[22] Filed: May 5, 1980

[51] Int. Cl.³ .............................................. B02C 18/18
[52] U.S. Cl. ................................. 241/282.1; 83/356.3; 83/592
[58] Field of Search ............ 241/199.12, 282.1, 282.2, 241/292.1; 83/356.3, 592

[56] References Cited

U.S. PATENT DOCUMENTS

| 1,869,220 | 7/1932 | Klod . | |
|---|---|---|---|
| 2,259,623 | 10/1941 | Dieckmann . | |
| 2,649,882 | 8/1953 | Chopieska . | |
| 2,731,995 | 1/1956 | Sutherland et al. . | |
| 3,053,297 | 9/1962 | Brundler | 241/282.1 X |
| 3,493,022 | 2/1970 | Mantelet | 241/199.12 |
| 3,540,505 | 11/1970 | Buck | 241/292.1 |
| 3,892,365 | 7/1975 | Verdun | 241/282.1 X |
| 4,019,689 | 4/1977 | Hunt | 241/199.12 X |
| 4,127,342 | 11/1978 | Coggiola | 241/282.1 X |
| 4,173,310 | 11/1979 | Schaeffer | 241/282.1 |

FOREIGN PATENT DOCUMENTS 1146628  4/1963  Fed. Rep. of Germany ... 241/282.2
1167149 11/1958  France .

Primary Examiner—Howard N. Goldberg
Attorney, Agent, or Firm—John F. Cullen; George R. Powers; Leonard J. Platt

[57] ABSTRACT

A rotary cutter blade for use in an unfluted constant diameter bowl of a motor driven food processor with a rotatable hub mounted on a vertically oriented drive shaft where the blade comprises a pair of generally parallel straight razor blade-type cutters secured to and extending oppositely away from the hub and terminating closely adjacent the bowl inner surface. A pair of similarly directed generally parallel straight integral support arms are vertically spaced on and extend oppositely away from the hub. Support arms having an average width greater than the cutters for adequate support. Suitable means secures the cutters to the bottom of their respective arms such that the cutters extend from the center of rotation to the bowl with about 20% of the cutter extending between the end of the support arm and the bowl inner surface, the structural arrangement providing a cutter whereby a wide variety of foods are chopped finer, more uniformly, and faster with a minimum amount of splashing in operation while also substantially reducing the amount of stainless steel required for fabrication.

5 Claims, 3 Drawing Figures

ROTARY CUTTER BLADE

BACKGROUND OF THE INVENTION

1. Field of the Invention

The invention herein pertains to a particularly shaped cutter blade for use in an unfluted or smooth inner surface diameter bowl of a food processor with a rotatable hub operatively driven by driving a vertically oriented drive shaft. The blade is formed of particularly shaped cutting surfaces structured to use inexpensive and easily formed straight razor cutters mounted to sweep substantially the entire inner bowl diameter to cut a wide variety of foods finer, more uniformly, and faster with reduced splashing.

2. Description of the Prior Art

Rotary cutting blade food processors, which operate in the area of 2000 rpm between mixers and blenders, have come into wide use. Rotary blade food processors are old in the art and are available for commercial use as large, high capacity machines generally with induction motors. Such processors are relatively expensive and heavy. Because of the success of such units, it was inevitable that a lighter weight, less expensive motor arrangement would appear and it has in the use of a geared down series motor. Because of different motor characteristics, the less expensive processors use a blade that has been marginal but a particular blade for use with the series motor that operates as well as the heavier induction motor operated processors is shown in U.S. Pat. No. 4,173,310 of common assignment and which has been successful in use. Most blades are generally of the familiar "S" general shape that have the disadvantage of being punched out of a large, thick piece of stainless steel of sufficient size to encircle a plastic hub for retention to the hub. In addition, an extra operation of serrating or scalloping is normally required, which is in addition to the individual operation of sharpening. Also the quality of sharpness of the curved blade varies substantially. Thus, there is a need for a specific blade that is compatible for use with the relatively inexpensive or lower cost food processors such as those using a small series motor for reduced cost requires less individual sharpening and handling, and that does not vary from blade to blade but can be made from stock steel much in the manner of razor blades with constant satisfactory repetition.

SUMMARY OF THE INVENTION

Briefly described, the invention is directed to a rotary cutter blade for use in an unfluted or smooth constant diameter bowl of a motor driven food processor with a rotatable hub mounted on a vertically oriented drive shaft with the cutter blade starting from a pair of generally parallel straight razor blade-type unserrated cutters that may be cut from standard stock and which are secured to and extend oppositely away from the hub. The cutters terminate closely adjacent the bowl inner surface and are supported by a pair of generally parallel straight integral support arms that are vertically spaced and also extend oppositely away from the hub with the average width of the support arms being greater than the cutters for adequate support. The cutters, which are preferably secured to the bottom of the respective arms, extend from the center of rotation to the bowl and have a portion extending between the end of the support arm and the bowl inner surface that is substantially 20% of the cutter length. Thus, the main object of the invention is to provide such a cutter blade that sweeps substantially the entire inner bowl diameter and provide structure whereby a wide variety of foods are chopped finer, more uniformly, and faster with a minimum of amount of splashing in operation. It also reduces substantially the amount of expensive stainless steel required for fabrication.

DESCRIPTION OF THE PREFERRED EMBODIMENT

Figure 1:
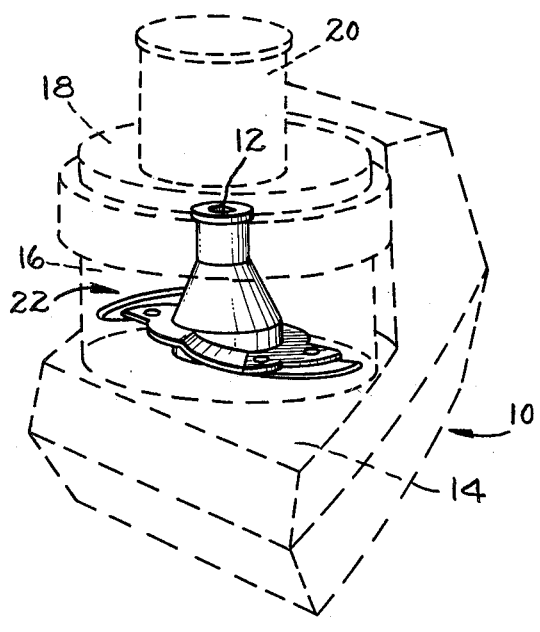
FIG. 1 is a phantom isometric view of a typical food processor showing the rotary cutter blade in solid lines.

The invention is directed to a particularly formed cutter blade for use with a food processor where it is possible to obtain a satisfactory chopping or mincing uniformity at speeds of 1500–2400 rpm—the operating speed of a common kitchen food processor. Referring to FIG. 1, there is shown a food processor comprising a base housing 10 which may contain a drive motor, preferably an inexpensive compact small series motor that drives vertical shaft 12 either direct or through a belt in normal fashion. The preferable "small series motor" is directed to a standard series motor having an armature diameter of no greater than 1⅜ inches (34.4 mm). This limitation, while not fixed, is preferable to keep the food processor, with which the motor is used in combination, all within a cost limit that permits a standard size processor to perform efficiently all the required and expected functions without increasing the motor size above the small series motor. The particular blade design disclosed herein is an improvement on that shown in U.S. Pat. No. 4,173,310 supra to perform the same functions in the same type processor with a less expensive cutter blade design and with no decrease in the size or performance of the food processor—i.e. it is interchangeable. For mincing and chopping foods, base housing 10 has a suitable platform 14 on which is mounted processor bowl 16 covered by lid 18 which is generally operable through an interlock such as shown in U.S. Pat. No. 4,111,372 of common assignment so that the processor cannot be operated unless the lid is securely in place to protect the user from the internal cutters 22. Food is directed into the bowl interior through the conventional chute 20 where the spinning cutter 22 or a disc, not shown, perform different cutting operations. As thus far described, the food processor is quite conventional.

While the rotary cutter blade to be described is usable with any motor driven processor, it is smoothly and efficiently operable within the general environment using a small series motor as fully disclosed in said U.S. Pat. No. 4,173,310 patent. To that device, the instant invention provides a different and better rotary cutter blade. In the common processor of FIG. 1 and as better shown in FIG. 2, the instant design of cutter blade permits the blade to uniformly chop or mince food while still allowing the use of a smooth inner surface on the bowl for easier cleaning so that bowl 16 is provided with a smooth unfluted constant diameter inner surface that is swept by the blades as shown in FIG. 2.

Since most common cutters are generally like a partial "S" shape with serrated or scalloped cutting edges, they require individual sharpening and handling and are individually made. Even those with substantially straight cutting edges are specially and individually formed not lending themselves to use of razor blade technology. Further, the quality of sharpness of such blades varies substantially. The development of razor blades has achieved a high degree of perfection and they are made from strip steel in very large numbers and with generally uniform sharpness since the formation from the substantially straight razor blades lends itself to consistent and even sharpening. To this end, the cutter structure herein consists of a pair of generally straight razor blade-type cutters 24 that are parallel to each other and that have a sharply honed cutting edge 26 that is shown in the top of FIG. 2 as a section of a conventional straight razor cutter and, in the bottom portion of FIG. 2, as the same cutter slightly curved to provide a demonstrably improved performance over the strictly straight edge. However, either cutter blade modification starts from the razor-blade type technology defined above and as used in the claims herein. The cutter blades are the easily machined and sharpened straight razor blade cutting stock which is rolled strip steel as opposed to the specially formed "S" shape curved serrated or scalloped individual blade heretofore. With the unfluted inner bowl surface, the individual cutters may extend to closely adjacent the inner surface as shown and, as usual in most cutter/processor applications.

Figure 3:
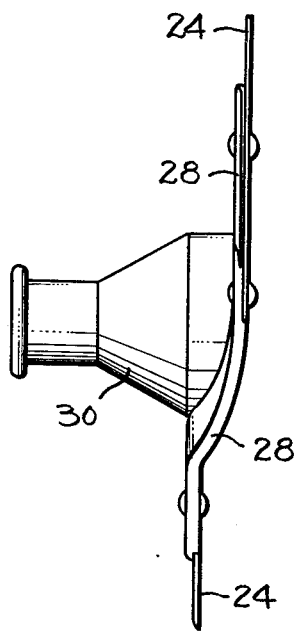
FIG. 3 is a side view of the blade/hub assembly.
Figure 2:
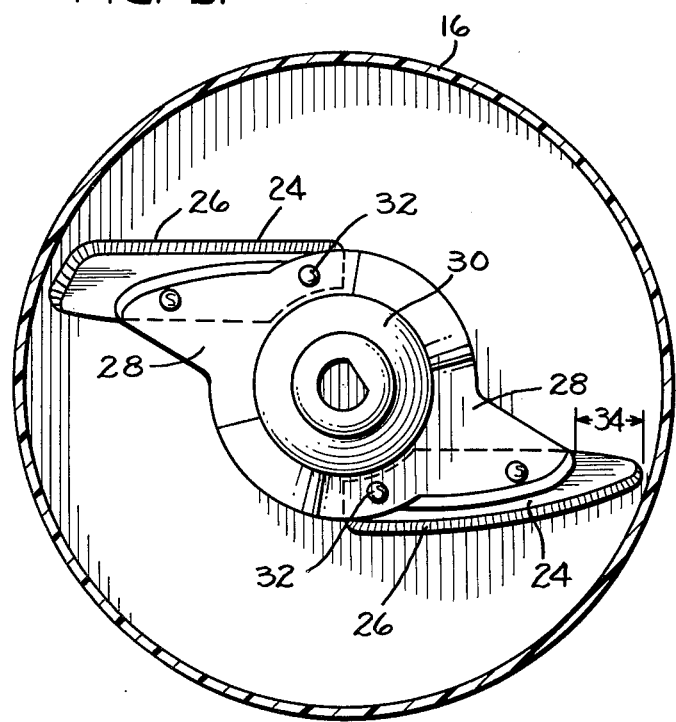
FIG. 2 is an enlarged top plan view of the shape of two similar cutter blades in position in the bowl.

In order to provide support for the cutter blades, a pair of support arms 28 are formed directly on and integral with plastic hub 30, the support arms being generally parallel to the cutters and extending substantially straight out from a portion on opposite sides thereof as shown in FIG. 2. The support arms account for about 80% saving in expensive stainless steel and are wide enough such that their average width is greater than the cutters to provide substantial support for the cutter blades. They preferably have a tapered or angled leading edge to decrease resistance and reduce splashing when cutting through food. As seen in FIG. 3, the integrally formed support arms 28 are vertically spaced a small distance to place the cutters on different levels as customary. Thus, the support arms and the cutter blades are generally parallel to and integral with each other as shown. Any suitable means such as rivets 32 may conveniently support at least half of each of the blades for a non-pivoting integral connection on the support arms. For proper cutting action and clearance of cut foods, the cutter blades are preferably secured to the underside of the support arms as shown in FIG. 3. Thus, the entire plate assembly consists primarily of a plastic hub 30 with its integrally formed support arms 28 for a stainless steel saving and two integrally connected and oppositely directed razor blade type cutters 24 extending from the rotating shaft outwardly to the inner surface of the bowl 16.

To avoid splashing, it is important that the support arms 28 terminate a selected distance in from the bowl inner surface and have a tapered leading edge and tip while at the same time extending outwardly far enough to provide adequate support for the cutters 24 consistent with handling of liquids in the processor. This clearance 34 has been found to be such that substantially 20% of the cutter 24 extends between the end of the support arm 28 and the bowl inner surface. Such structural limitation provides for maximum blade support with minimum splashing in operation. A smaller clearance increases the splashing of the liquids whereas a larger clearance does not reduce the splashing but does decrease the support provided by the arm to the cutters. Consequently, the ideal configuration or clearance for maximum support with minimum splashing is about 20% of the cutter at 34.

Thus, the present invention provides an improved rotary cutter blade over that shown in U.S. Pat. No. 4,173,310 starting with the use of standard strip metal while partaking of the technical expertise of razor blade manufacturing which has achieved a high degree of perfection. This is achieved by substituting substantially straight razor blade-type unserrated cutters on a special hub for parallel support with support arms that are substantially parallel thereto such that the straight razor knife blades can be sharpened with either a single or double bevel without a substantial effect on performance. Further, an improved chopping or mincing performance is provided on all kinds of foods by the unserrated blades with reduced splashing by the formation and clearance 34 of the blade for a wide variety of chopping action whereby the foods are chopped finer, more uniformly, and faster, all with adequate blade support and minimum splashing.

While we have hereinbefore shown preferred forms of the invention, obvious equivalent variations are possible in light of the above teachings. It is therefore to be understood that, within the scope of the appended claims, the invention may be practiced otherwise than as specifically described, and the claims are intended to cover such equivalent variations.

We claim:

1. A rotary cutter blade assembly for use in an unfluted constant diameter bowl of a motor driven food processor with a rotatable hub mounted on a vertically oriented drive shaft and with the bowl being closed by a cover with an opening therein for feeding material to the bowl, the assembly comprising,
   a pair of generally parallel straight razor blade-type cutters extending oppositely away from the hub,
   said cutters terminating closely adjacent the bowl inner surface,
   a pair of generally parallel straight integral support arms with a tapered leading edge and tip said arms being vertically spaced and extending oppositely away from said hub,
   means integrally securing said cutters to respective arms with the cutters extending from the center of shaft rotation to the bowl inner surface to sweep substantially the entire inner bowl diameter,
   the support arms extending over at least half of the length of its blade to provide at least fifty percent support thereof,
   whereby a wide variety of foods are chopped finer, more uniformly, and faster with reduced splashing.

2. Apparatus as described in claim 1 wherein each cutter is secured to the bottom of its respective arm.

3. Apparatus as described in claim 2 wherein each cutter is secured to its respective support arm substantially parallel thereto.

4. Apparatus as described in claim 3 wherein the support arms have an average width greater than said cutters for support thereof.

5. Apparatus as described in claim 4 wherein said arms terminate so that substantially 20% of the cutter extends between the end of the support arm and bowl inner surface for maximum blade support with minimum splashing in operation.

* * * * *